May 31, 1955  R. L. ANDERSON, JR  2,709,791
SATURABLE REACTOR
Filed Oct. 20, 1950

INVENTOR.
ROBERT L. ANDERSON, Jr.
BY
Roland A. Anderson
ATTORNEY.

United States Patent Office 2,709,791
Patented May 31, 1955

2,709,791

SATURABLE REACTOR

Robert L. Anderson, Jr., El Cerrito, Calif., assignor to the United States of America as represented by the United States Atomic Energy Commission Application October 20, 1950, Serial No. 191,304

1 Claim. (Cl. 336—155)

The present invention relates to electrical control means and in particular to improvements in saturable reactors.

Conventional saturable reactors commonly consist of an inductance wound about an iron core whose permeability is changed by varying the flux density therethrough. Variation of the flux density through the core is accomplished by provision of a direct current winding about the core through which a controlled direct current is passed. Design considerations have dictated that three or four legged cores be employed and preferably that two alternating current windings be employed in order to balance the inductive effect thereof in the direct current control winding.

Conventional saturable reactors have certain limitations which make them unsuited for particular applications and in some respects curtail their usefulness in their common applications. For example, the core loss in conventional saturable reactors becomes prohibitive at high flux values, also core permeability variations decrease with increased frequency, and difficulty is encountered in accurately balancing the two alternating current coils in order to prevent induction of a signal in the direct current control winding.

The present invention contemplates a new and novel saturable reactor having particular advantages over saturable reactors of conventional design whereby the limitations thereon, including those above noted, are overcome and the applicability and usefulness of saturable reactors materially expanded.

It is an object of the present invention to provide a new and improved saturable reactor.

It is another object of the present invention to provide an improved saturable reactor having very low losses.

It is another object of the present invention to provide an improved saturable reactor capable of efficiently operating upon a radio frequency voltage.

It is a further object of the present invention to provide an improved saturable reactor having but a single winding.

It is a still further object of the present invention to provide an improved saturable reactor of simple design and construction capable of carrying a very heavy direct current control current with very low losses.

Many other advantages of the invention will become apparent to those skilled in the art from the following description of construction and operation taken together with the accompanying drawing wherein.

Figure 2:
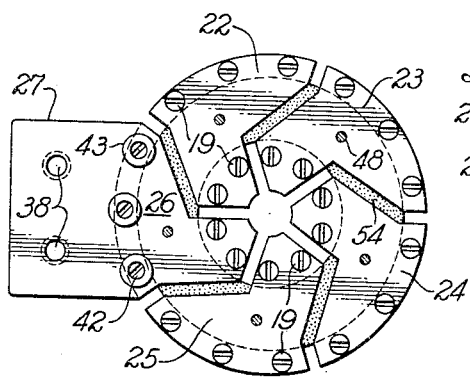
Fig. 2 is a sectional view taken on plane 2—2 of Fig. 1.

Considering the invention as illustrated in Figs. 1-4, it will be noted that the saturable reactor 10 consists of a generally cylindrical outer shell 11 which in turn is divided into a plurality of similar longitudinal segments or staves 12, 13, 14, 15, and 16. The staves 12–16 of shell 11 are formed of an electrically conducting material, such as copper, for example, and are separated about the circumference of shell 11 by air gaps between the staves. Internal to cylindrical shell 11 and concentric therewith is disposed a second cylindrical member 17 of lesser diameter than shell 11 and which, like shell 11, is divided into similar longitudinal sections 12', 13', 14', 15', and 16'. The segments of inner cylinder 17 are also separated by air gaps and are disposed opposite the air gaps between the staves of shell 11. Thus in plan view the segments of inner cylinder 17 are offset with respect to the staves 12–16 of outer shell 11. Also staves 12–16 and segments 12'–16' are preferably all formed with substantially equal cross sectional areas to approximate equal electrical resistance therethrough.

In addition to the above-noted outer shell 11 and inner cylinder 17, there is provided connections between the segments of these elements. This is accomplished by connecting plates such as, for example, plate 22 which joins outer stave 12 and inner segment 12'. Plate 22 has a rather irregular configuration in order to provide a maximum contact surface with the elements which it connects and to remain isolated from like connecting plates adjacent thereto. Plate 22 rests upon the top of stave 12 and segment 12' and includes a portion with a curved periphery corresponding to the curvature of stave 12 and extending the width of stave 12, a portion having the same outline as the three inner sides of segment 12', and a portion connecting the two above portions. Plate 22 is secured to stave 12 and segment 12' by screws 19 which pass through plate 22 and engage threaded holes in stave 12 and segment 12'. There is also provided about the top of saturable reactor 10, plates 23, 24, and 25, which are identical in construction to plate 22 and which connect elements 13 and 13', 14 and 14', and 15 and 15', respectively, and are secured by screws 19. One other plate 26 of similar shape but with a lug 27 projecting therefrom, is connected to segment 16' of inner cylinder 17 and completes the top of saturable reactor 10. Stave 16 of outer shell 11 is shorter in length than staves 12–15 and the top thereof is thereby disposed at a distance below plate 26 which passes thereover. To the top of stave 16 there is secured a lug 28 which projects outwardly from shell 11 in a generally parallel relationship with lug 27.

At the bottom of the saturable reactor there is provided a plurality of connector plates 32–36 which have the same configuration as plate 22. These plates do not, however, connect the same elements as the plates at the top of the assembly but instead are reversed to connect the staves 12–16 of shell 11 to adjacent segments 12'–16' of inner cylinder 17. Thus plate 32 connects elements 12 and 13', plate 33 connects elements 13 and 14', plate 34 connects elements 14 and 15', plate 35 connects elements 15 and 16', and plate 36 connects elements 16 and 12'. Lower connecting plates 32–36 are secured to staves 12–16 and segments 12'–16', as by screws 19, and as both top conecting plates 22–26 and bottom connecting plates 32–36 are formed of an electrically conducting material such as copper which forms a good electrical contact with the elements to which it is attached, it will be apparent that a closed electrical path exists through the saturable reactor. Lugs 27 and 28 form the ends of this electrical path and are employed as terminals for the energization of saturable reactor 10. To aid in the connection of electrical leads to lugs 27 and 28, there may be provided apertures 38 and 39 in lugs 27 and 28, respectively, for the insertion of clamping means (not shown).

Figure 1:
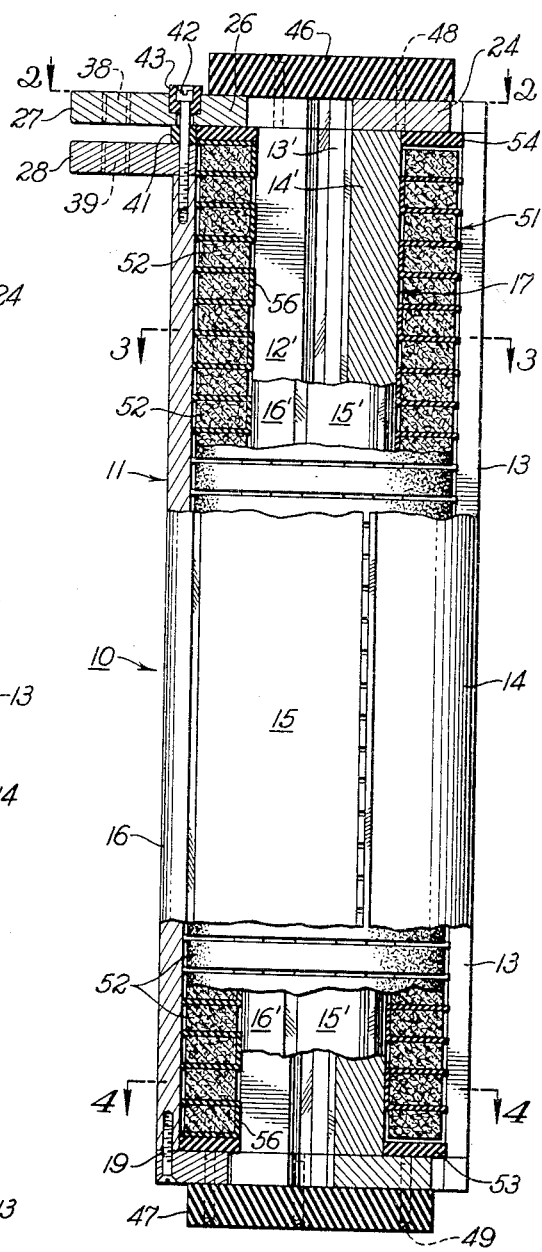
Figure 1 is a longitudinal view of one embodiment of the invention partially in cross section.

Between lugs 27 and 28 there is provided an insulator 41 which is disposed atop stave 16. Insulator 41 is maintained in position by screws 42 which pass through apertures in lugs 27 and 28 and through insulator 41 and threadably engage stave 16. Screws 42 are insulated from lug 27 by cylindrical insulators 43 which surround screws 42 and fit into expanded portions of the apertures through lug 27, all as shown in Fig. 1.

In order to prevent relative movement of staves 12–16 and segments 12'–16', and consequent contact between associated connecting plates 22–26 and 32–36, there is provided a pair of insulating discs 46 and 47 which are mounted one at each end of cylinder 11. Discs 46 and 47 are mounted by means of screws 48 and 49, respectively, which secure discs 46 to connecting plates 22–26 and disc 47 to connecting plates 32–36, all as shown in Fig. 1.

Figure 3:
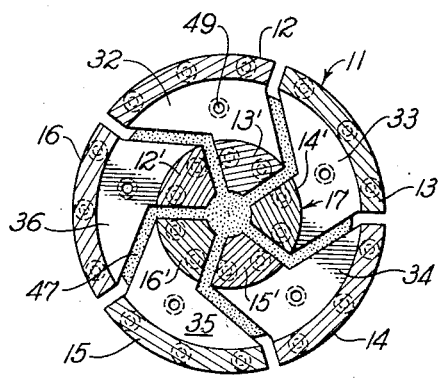
Fig. 3 is a sectional view taken on plane 3—3 of Fig. 1.
Figure 4:
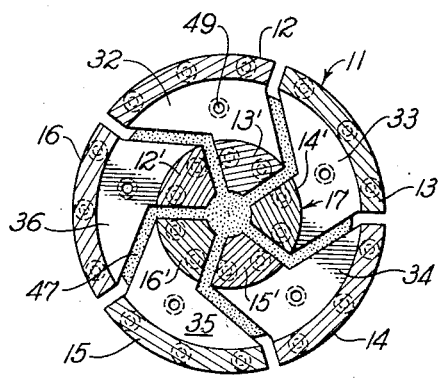
Fig. 4 is a sectional view taken on plane 4—4 of Fig. 1 with the core and insulation removed to show the bottom connections of the assembly.

In addition to the above elements of the invention there is provided a generally cylindrical core 51 which is disposed within outer shell 11 and about inner cylinder 17. While core 51 may be formed of conventional core material such as, for example, laminated iron or Permalloy, particular advantages result from the use of a ferromagnetic non-metal for this purpose. In particular, it has been discovered that cubic ferrites of the general formula $MO.Fe_2O_3$, in which M stands for a bivalent metal ion, may be advantageously employed as core material. Without delving too deeply into the complex theory of ferromagnetic non-metals it is sufficient to note that hysteresis may be practically eliminated by the proper combination of metal ions with $Fe_2O_3$, as for example MnZn ferrite. By reducing the magnetostriction constant and the crystal anisotropy to zero, which is possible in an alloy including materials having positive and negative values of these quantities, it is possible to reduce the hysteresis to practically zero. Note is also made of the fact that the use of zinc in the ferrite alloy increases the permeability, which is generally desirable. The core 51 may be formed as a cylinder or, as is more convenient with cubic ferrites, may be formed as rings 52 as illustrated. These rings are stacked one upon the other and are separated from bottom connecting plates 32–36 by an annular insulator 53 and from top connecting plates 22–26 by a like insulator 54, each of which may be made of teflon or other suitable insulating material. Discs 52 are also separated from inner cylinder 17, outer shell 11, and each other by insulating spacers 56 which are formed in the shape of a U and are slipped upon rings 52 from the inside so that in assembly the bottom of the U abuts inner cylinder 17 and the legs thereof extend to outer shell 11 as shown in Figs. 1 and 3. Spacers 56 are constructed with a nominal width and a number of spacers are employed for each ring, all as shown in Fig. 3. These spacers may be readily formed of teflon or the like by a simple bending process; however, it will be apparent that numerous different types of spacing and insulating means may be employed for this purpose.

It will be noted from the above description of the embodiment of the invention illustrated that there is provided a single closed electrical path between protruding lugs 27 and 28 of saturable reactor 10 through staves 12–16, segments 12'–16', top connecting plates 22–26, and bottom connecting plates 32–36. These elements are all maintained in definite fixed relationship relative to each other with fixed insulating air gaps therebetween. Also the above-noted electrical path surrounds a magnetically permeable core 51 which is spaced apart from the conductors of saturable reactor 10 and which has particularly desirable properties as noted above and further discussed below.

As noted above, the present invention has but a single winding and thus in operation both the direct current control voltage and the alternating current voltage to be controlled is connected between lugs 27 and 28. With such connections an increase in the direct current (or D. C.) control current increases the flux density through the core 51 which thereby decreases the permeability thereof. This decrease in permeability produces a consequent reduction in the effective inductance of the winding which may be employed for the purpose of voltage or frequency control. If, for example, the present invention is employed in the tank circuit of a high frequency oscillator, a variation in the D. C. control current will produce a consequent change in the effective inductance of the saturable reactor which thereby varies the frequency of oscillation.

The present invention has proven particularly effective in the control of high frequency voltages as, for example, in the application noted above. Conventional saturable reactors are limited by the fact that the range of permeability variation decreases as the frequency of the voltage to be controlled increases, which materially reduces the range within which a high frequency voltage may be controlled. The present invention is not so limited inasmuch as the permeability of the core is not markedly affected by high frequency voltages and the present invention is thus useful in communication circuits wherein conventional saturable reactors are unsuited.

In addition to the above-noted advantages of the invention, attention is directed to the following features which distinguish the present invention from conventional saturable reactors and which in combination endow the present invention with capabilities and advantages far in excess of those hitherto available from saturable reactors. There is first to be noted the type of construction employed in the present invention which embraces only simple rugged elements and which furthermore lends itself to rapid and facile assembly with a minimum of complicated and lengthy operations. Also as a result of the type of current-carrying conductors employed, very high currents may be passed through the reactor without damage from overheating and the manner in which these conductors are assembled invites the addition of cooling means with a minimum of alteration. With regard to overheating, it should also be noted that the extensive use of air insulation is particularly advantageous in that natural cooling of the conductors is maximized and the addition of forced cooling as by gas or liquid is readily accommodated. With regard to the disposition of the current-carrying conductors, it is emphasized that they completely surround the core which results in lower losses and consequently high efficiency. The efficiency is further maximized by the construction and composition of the core proper which exhibits remarkably low losses both from eddy current losses and magnetic after effects. Also as noted above, the novel structure which combines the D. C. and A. C. coils into a single conductor about the core has the advantage of simplifying design and construction considerations, as well as obviating difficulties attendant balancing the two A. C. coils conventionally employed and blocking the A. C. signal from the D. C. control circuits which may be instead accomplished by proper connection of a pair of the present saturable reactors. As a consequence of the above-noted construction the reactor has very low distributed capacity, low saturated inductance, and low leakage reactance, or in other words, most frequency change from an unsaturated to a saturated state. The above-disclosed reactor has the added advantage of having low copper loss and of comprising only readily replaceable members. From the above, it is believed apparent that the present invention has capabilities and advantages far in advance of conventional devices of the same general type and that these result from the novel structure of the instant invention.

While the present invention has been disclosed with reference to only a single embodiment it will be evident to those skilled in the art that numerous modifications are possible within the spirit and scope of the invention, and thus it is not intended that the invention be limited except as defined in the following claim.

What is claimed is:

In a saturable reactor a first longitudinally segmented cylinder, a second longitudinally segmented cylinder disposed concentric with and about said first cylinder, said cylinders being disposed with the segments of said first cylinder offset with respect to the segments of said second cylinder, a first set of connecting plates disposed atop said cylinders and secured to and electrically connecting individual segments of said first cylinder to individual adjacent segments of said second cylinder, a second set of connecting plates disposed at the bottom of said cylinders and secured to and electrically connecting alternate segments of each to form one electrical path through the segments of said first and second cylinders, a pair of terminals connected one to a segment of said first cylinder and one to a segment of said second cylinder at opposite ends of said single electrical path, a plurality of annular rings formed of a magnetic material and disposed about said first cylinder inside said second cylinder in stacked relationship to each other and insulated from said cylinders, said annular rings having an inner diameter greater than the outer diameter of said first cylinder and an outer diameter less than the inner diameter of said second cylinder, a plurality of insulating spacers engaging said rings and separating same from each other, said spacers having a substantially U-shaped cross section with a bottom portion connecting two leg portions and slidably engaging said rings with the bottom portions thereof intermediate said rings and said inner cylinder whereby said rings are electrically insulated from said cylinders and separated from each other, and a pair of insulating cover plates disposed one at each end of said cylinders and engaging the connecting plates there secured to maintain the assembly in rigid relationship.

References Cited in the file of this patent

UNITED STATES PATENTS

| 1,986,884 | Fassler | Jan. 8, 1935 |
| 2,127,237 | Sola | Aug. 16, 1938 |
| 2,236,162 | Von Henke | Mar. 25, 1941 |
| 2,452,530 | Snoek | Oct. 26, 1948 |
| 2,585,654 | Hewlett, Jr. | Feb. 12, 1952 |

OTHER REFERENCES

"Monographs on the Progress of Research in Holland During the War," by J. L. Snoek, Elsevier Publishing Co., Inc., New York, 1947, pages 68–71.